June 7, 1966  R. P. LYNN  3,254,961
CARBON BLACK FURNACE
Filed Oct. 8, 1963
2 Sheets-Sheet 2
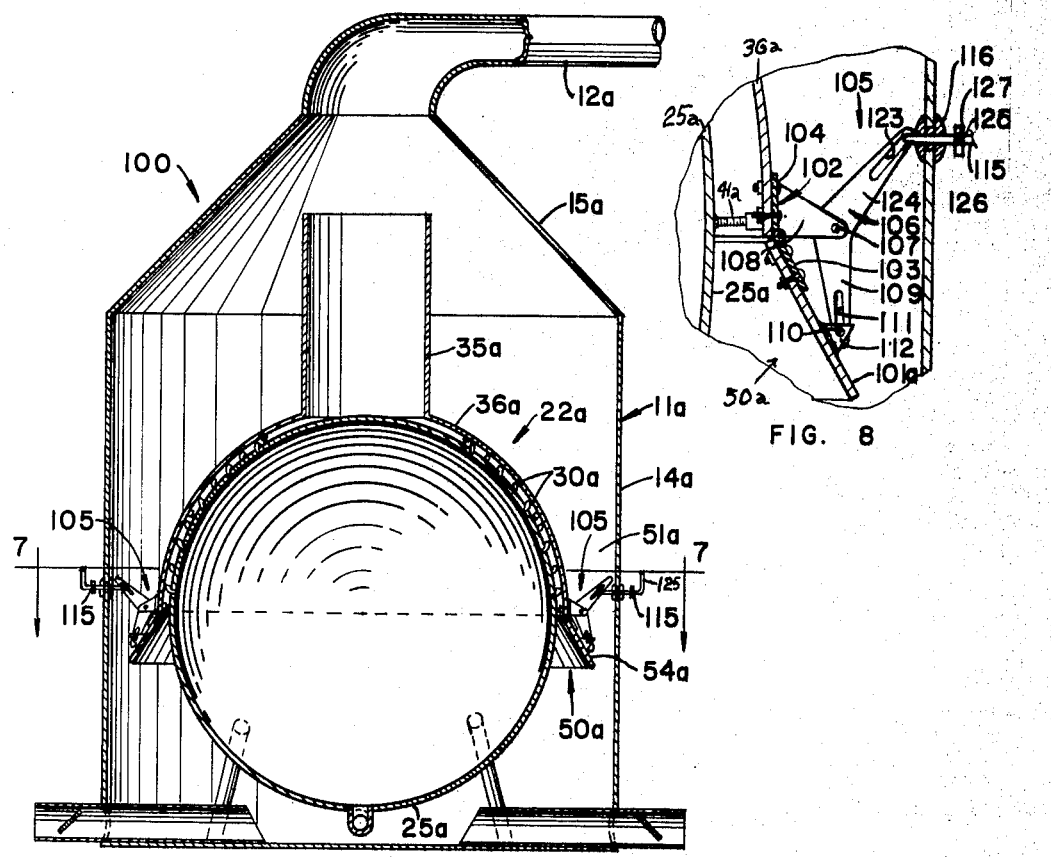
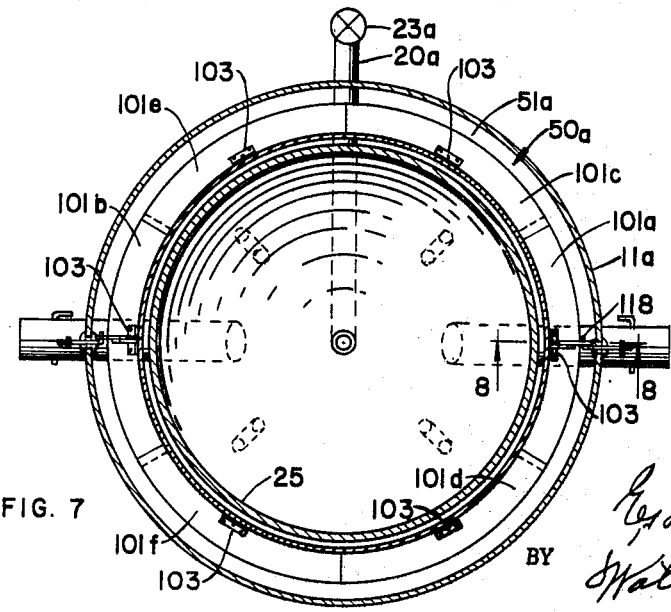
INVENTOR
RICE P. LYNN
BY
ATTORNEYS United States Patent Office 3,254,961
Patented June 7, 1966

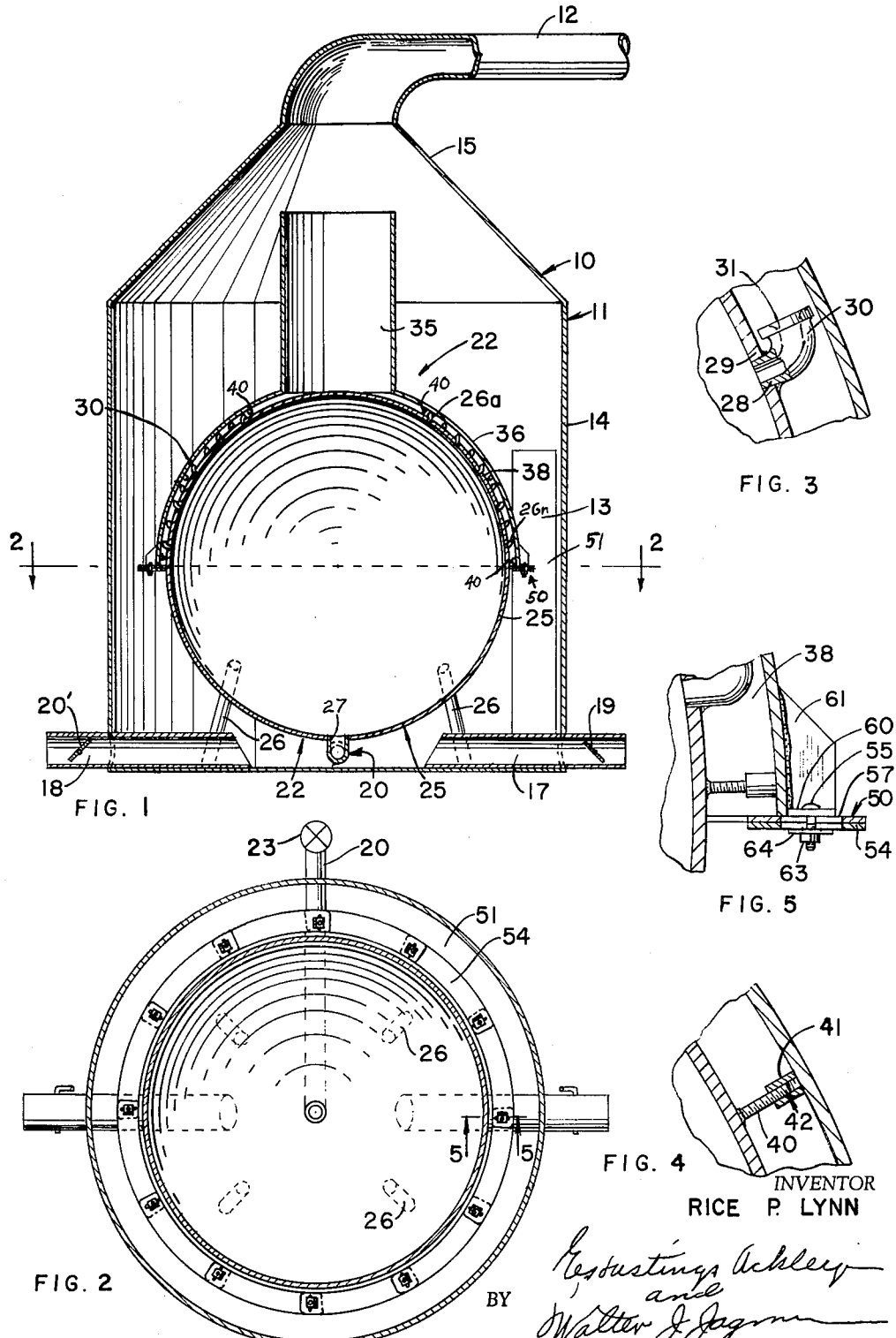

3,254,961
CARBON BLACK FURNACE
Rice P. Lynn, San Angelo, Tex., assignor to Newmatic Carbon Black Company, San Angelo, Tex., a corporation of Texas
Filed Oct. 8, 1963, Ser. No. 314,695
10 Claims. (Cl. 23—259.5)

This invention relates to apparatus for producing carbon black.

This application is a continuation-in-part of the copending application, Serial No. 161,672, filed December 22, 1961, now U.S. Patent Number 3,150,933.

An object of this invention is to provide a new and improved apparatus for producing carbon black by incomplete combustion of gaseous hydrocarbons, natural gas, for example.

Another object is to provide an apparatus for producing carbon black having a burner in which the gases which are to be subjected to partial combustion or thermal decomposition are preheated prior to their exposure to a combustion supporting gas.

Still another object is to provide an apparatus for manufacturing carbon black having a furnace and a burner disposed in the furnace which includes a vessel provided with a plurality of outlet nozzles communicating with the exterior of the vessel, with the upper ends of the passages of the nozzles being spaced from the domed top of the vessel, the burner including a substantially semi-spherical hood disposed in spaced relation over the upper domed portion of the vessel to provide an annular passage through which oxygen bearing gases introduced into the furnace may flow upwardly to mix with the gaseous hydrocarbons being discharged through the outlet nozzles of the vessel, wherein the apparatus is provided with means for adjusting the ratio of flow of oxygen bearing gases through the annular passage and between the hood and furnace to control the temperature in the annular passage.

Still another object is to provide an apparatus for producing carbon black wherein the oxygen bearing gases flowing between the furnace and the hood absorb heat liberated due to the partial combustion of the gaseous hydrocarbons to maintain the temperature within the annular passage from exceeding a predetermined value.

A further object is to provide an apparatus for manufacturing carbon black wherein the hood is provided with a discharge stack which extends a substantial distance upwardly therefrom toward the outlet of the furnace whereby the mixture of gases and carbon flowing upwardly through the discharge stack are further cooled prior to their mixing with the oxygen bearing gases which flow between the hood and the furnace.

A still further object is to provide an apparatus for manufacturing carbon black wherein the means for varying the ratio of flow of the oxygen bearing gases through the annular passage and between the hood and the furnace is controlled by means which varies the effective orifice of the annular passage between the hood and the furnace.

Another object is to provide an apparatus for manufacturing carbon black wherein the flow control means is adjustable from the exterior of the furnace.

Still another object is to provide an apparatus for manufacturing carbon black wherein the furnace is formed of a good heat conducting substance, such as metal, to further facilitate the cooling of the gases in the furnace.

Additional objects and advantages of the invention will be readily apparent from the reading of the following description of a device constructed in accordance with the invention, and reference to the accompanying drawings thereof, wherein:

FIGURE 1 is a vertical partly sectional view of an apparatus for manufacturing carbon black embodying the invention;

FIGURE 2 is a horizontal sectional view taken on line 2—2 of FIGURE 1;

FIGURE 3 is a fragmentary partly sectional view of the burner vessel and the hood;

FIGURE 4 is a fragmentary sectional view showing a means for adjusting the position of the hood on the burner;

FIGURE 5 is a vertical sectional view taken on line 5—5 of FIGURE 2;

FIGURE 6 is a vertical sectional view of an apparatus for manufacturing carbon black embodying the invention having a modified form of the vanes for controlling the flow of oxygen gearing gases through the annular passage between the hood and the furnace;

FIGURE 7 is a sectional view taken on line 7—7 of FIGURE 6; and

FIGURE 8 is a sectional view taken on line 8—8 of FIGURE 7.

Referring now particularly to FIGURES 1 through 5 of the drawings, the apparatus 10 for producing carbon black embodying the invention includes a furnace 11 having a discharge conduit 12 which may be connected to suitable fans or suction blowers for removing gases and carbon black suspended or flowing in such gases from the interior of the furnace. The furnace may be provided with a suitable access door 13. The furnace has a substantially cylindrical wall portion 14 and an upwardly and inwardly sloping or beveled top portion 15 to whose upper end the exhaust or discharge conduit 12 is connected. Air ducts 17 and 18, provided with suitable flow regulator valves 19 and 20', respectively, extend into the furnace in its lower end to provide a means by which gases bearing oxygen may be introduced into the furnace. A gas duct 20 also extends into the furnace to supply gaseous hydrocarbons to the burner 22 disposed in the furnace. A suitable regulator valve 23 is provided in the gas duct to regulate the flow of the gaseous hydrocarbons to the burner.

The burner 22 includes a spherical vessel 25 mounted on four legs 26 which extend annularly outwardly from the bottom portion of the vessel. The gas duct 20 is connected to the burner at its central bottom porion as by a fitting 27 so that the gas must flow upwardly through the burner. The top or domed portion of the burner is provided with a plurality of outlet tips or nozzles 30 whose lower reduced portions 28 extend into suitable apertures or bores 29 of the vessel and are secured to the vessel in any suitable manner, as by welding. The nozzles have outlet passages 31 which taper upwardly and outwardly so that the uppermost discharge portions of the passages are of greater diameter than the lowermost portions thereof. As a result the gas moving upwardly through the passages 31 from the interior of the burner vessel 25 loses velocity as it moves upwardly therethrough and has a very low exit velocity. The nozzles are all of such configurations that the passages 31 thereof all open upwardly. The nozzles are disposed in substantially uniform spaced relationship. The uppermost annular row of the nozzles 26a is aranged in a circle on the vessel outwardly of the lower end of the outlet stack 35 of a hood 36 disposed in spaced relationship about the top portion of the vessel. The lowermost row or circle of nozzles 26a is disposed above the bottom annular end of the hood 36. The hood is substantially semispherical and is supported on and in spaced relation to the top portion of the vessel to form an annular passage 38 by a plurality of threaded studs 40 rigidly secured to the burner vessel which are threaded to the spacer sleeves 41. It will be apparent that when the spacer sleeves 41 are rotated in one direction they telescoped further inwardly on the studs 40 and when rotated in the other direction they extend farther outwardly of the outer ends of the studs 40. Thus the position of the hood and the effective width or orifice of the annular passage 38 may be adjusted by adjusting the position of the hood on the vessel. The sleeves may be secured in any adjusted position on the studs by any suitable means such as set screws 42.

The annular arcuate hood is provided with a damper or flow control means 50 for varying the ratio of flow of air through the annular passage 38 and through the annular passage 51 between the hood and the furnace. The flow control means may include a plurality of arcuate segments or plates 54 whose adjacent ends overlap which are adjustably supported by means of the bolts 55 which extend through suitable elongate aligned apertures 57 in the segments 54 and in the horizontal flanges 60 of the brackets 61 rigidly secured to the hood, as by welding. The bolts are of course provided with nuts 63 and washers 64 which span the widths of the slots.

It will be apparent that when the segments 54 are moved outwardly the effective orifice of the annular flow passage 51 is decreased while the passage 38, whose lower end is defined by the outer surface of the burner vessel and the inner edges of the segments, is increased. Conversely when the segments are moved inwardly the flow passage 51 is increased and, if the segments 54 are moved to such positions so that they extend past the lower edge of the hood toward the outer surface of the burner surface, the effective orifice of the annular passage 38 is decreased.

The oxygen as a constituent of the air is introduced into the furnace 11 through the air inlet ducts or pipes 17 and 18 at a rate controlled by the valves 19 and 20′ and simultaneously gaseous hydrocarbons, such as natural gas, are caused to flow at a rate controlled by the regulator valve 23 into the lower end of the vessel and thence outwardly and upwardly through the passages 31 of the nozzle into the annular passage 38. The oxygen bearing air flows into the furnace below the burner vessel, a portion thereof flowing upwardly into the lower end of the annular passage 51 between the hood and the furnace. The ratio of the rates of flow of the gas into the combustion chamber or passage 38 and the passage 51 are of course controlled by the flow control means 50. The oxygen bearing gases flowing into the combustion chamber flow not only outwardly and over the outlet nozzles in the chamber but also flows upwardly and over the domed portion between the outer surface of the burner vessel and the nozzles to provide a thorough mixing of the air with the gaseous hydrocarbons flowing outwardly of the passageways of each of these outlet nozzles and also to provide oxygen for mixture with the gaseous hydrocarbons flowing from everyone of the outlet nozzles. The oxygen thus introduced and mixed with the gaseous hydrocarbons flowing at low velocity from the outlet nozzles causes partial combustion of the gaseous hydrocarbons and raises the temperature of the gases in the combustion chamber. The air flows upwardly through the annular passage 38 where swirling or spiral movement is induced in the gases flowing therethrough as they move to the outlet stack 35 of the hood. This spiral movement of the hot gases and products of the partial combustion of the gaseous hydrocarbons causes them to contact the inner surfaces of the hood 36 and of the outlet or the discharge stack which act as a contact catalyst to cause the products of the partial combustion of the hydrocarbons to crack and form carbon black.

The rise in the temperature in the chamber caused by this partial combustion of course causes an acceleration of the velocity of the flow of gases through the discharge stack into the upper portion of the furnace immediately below the inlet of the discharge duct 12 of the furnace, the gases and the carbon black which is suspended therein moving upwardly and outwardly of the discharge duct 35 are mixed with the upper portion of the furnace with the relatively cooler air flowing upwardly between the burner vessel and hood and the furnace and moved therewith to the discharge duct 12 of the furnace and thereby to suitable separating apparatus.

The temperature within the combustion chamber 38 and the duct 35 of the hood is prevented from rising to excessive or undesired temperature by the cooling effect of the air flowing upwardly in the furnace exteriorly of the hood and its stack. The furnace is not insulated so that it conducts heat from the interior of the furnace and helps cool the gases in the furnace. The amount and type of carbon produced by the apparatus may be varied not only by varying the rate of introduction of the gaseous hydrocarbons into the vessel and of the oxygen bearing gas into the furnace but also by varying or adjusting the ratio of rates of flow of the oxygen bearing gas in the annular passage or combustion chamber 38 and in the passage 51 between the hood and the furnace.

It will of course be apparent that the gaseous hydrocarbons, prior to their being discharged through the passageways 31 of the outlet vessel, are preheated in the vessel 25 since they remain an appreciable length of time in the vessel due to its relative large capacity and since the temperature within the burner vessel is elevated due to the release of heat from the partial combustion of the gaseous hydrocarbons in the annular passage 38. The hydrocarbons flowing into the combustion chamber are initially ignited in any suitable manner, as by a flame introduced into the combustion chamber, access to the burner for this purpose being had through the access door 13.

It will now be seen that the apparatus for producing carbon black includes a furnace 11 having a discharge duct 12 at its upper end through which the products of the partial combustion of hydrocarbons and oxygen are removed from the furnace, a burner 22 disposed in the lower portion of the furnace and provided with gaseous hydrocarbons by means of the inlet pipe or duct 20 which extends into the furnace, and the oxygen or air inlet pipes or ducts 17 and 18 which introduce oxygen into the furnace at a controlled rate to provide for only partial combustion of the gaseous hydrocarbons.

It will further be seen that the burner includes a preheater vessel 25 into which the hydrocarbons are admitted for preheating, that the vessel is substantially spherical and its domed top portion has outlet nozzles 30 which extend outwardly from its top portion and are provided with discharge or outlet passages 31 whose diameter increases outwardly to the outer ends of the nozzles to lower the velocity of the hydrocarbons escaping through the discharge ends of the outlet passages.

It will further be seen that the outer ends of the nozzles are spaced from the top portion of the vessel to permit the oxygen bearing gases, such as air to circulate between and below the upper ends of the nozzles so that the stream of gaseous hydrocarbons flowing from each nozzle is provided with oxygen at a rate which provides for the substantially uniform partial combustion of the hydrocarbons flowing from all of the nozzles.

It will be further seen that the burner is provided with a substantially semi-spherical hood 36 which telescopes over the top portion of the burner vessel to provide with the vessel an annular inwardly and upwardly arcuate passage 38 through which air may flow upwardly to the nozzles and then through the annular passage to the discharge duct 35 of the hood disposed above the central top portion of the burner vessel.

It will further be seen that the volume of the annular passage 38 may be adjusted by varying the position of the hood on the burner top, it being apparent that the volume is increased if the spacer sleeves 41 are rotated to move them outwardly on the studs 40.

It will further be seen that the apparatus includes a passage for bypassing a portion of the air introduced into the furnace between the hood and the internal surfaces of the furnace so that the temperature within the annular passage 38 and the discharge duct 35 is controlled and prevented from rising to excessive values by the flow control means.

It will further be seen that prior to the movement of the hot gases and the carbon suspended therein from the discharge stack 35 of the hood to the discharge duct 12 of the furnace, they are mixed with the air flowing upwardly through the annular passage 51 between the hood and the furnace.

Referring now particularly to FIGURES 6, 7 and 8 of the drawing, the modified form of the apparatus, 100, illustrated therein is substantially similar to the apparatus 10 and accordingly components of the apparatus 100 have been provided with the same reference numerals, to which the subscript "a" has been added, as the corresponding elements of the apparatus 10. The flow control means 50a of the hood 36a includes a plurality of arcuate substantially cylindrical sections or plates 101 which are pivotally secured to the hood 36a by any suitable means, as by the hinges 102 whose lower butt plates 103 are rigidly secured to the outer surface of the arcuate plates and whose upper butt plates 104 are secured to the outer surface of the hood. A pair of diametrically opposite segments 101a and 101b have their outer end portions extending below and in overlapped relationship to adjacent segments 101c and 101d, and 101e and 101f, respectively, so that when the segments 101a and 101b are raised, the other segments are also raised.

Each of the plates 101a and 101b is movable upwardly by a suitable linkage 105 which includes a bell crank lever 106 pivotally secured, as at 107, to a bracket 108 rigidly secured to the hood 36a which extends radially outwardly therefrom. The lower end of one arm 109 of the lever is pivotally secured to the segment 101a or 101b by means of a pivot pin 110 which extends through a suitable elongate slot 111 of the bell crank lever and is secured to a lug 112 which extends radially outwardly from the plate. The crank is pivotable about the pin 107 by a rod 115 which extends through a suitable bearing 116 secured to the furnace and whose inner end is provided with an arm 118 which extends through an elongate slot 123 in the other arm 124 of the lever. The outer end of the rod may be provided with a handle portion 125. A stop collar or ring 126 may be secured to the lever in any adjusted position thereon by means of the set screw 127 to limit inward movement of the lever.

It will be apparent that when the slide rod 115 is moved inwardly, the bell crank lever is pivoted to move its lower arm upwardly and pivots its associated plate 101a or 101b and the adjacent plates on opposite ends thereof upwardly to decrease the effective orifice of the annular passage 51a between the hood and the furnace and that when it is moved outwardly, the plates are moved downwardly to increase the effective orifice of the passage 51a. It will also be apparent that the flow control 50a is adjustable from the exterior of the furnace.

It will now be apparent that the apparatus 100 operates in the same manner as the apparatus 10 to produce carbon black from hydrocarbon.

It will further be seen that while a particular type of valve or damper means for controlling the orifice, and therefore the rate of flow of air, through the annular passage between the hood and the furnace has been illustrated and described, any suitable other valve means or damper means for this purpose may be used. For example, the segments or plates 50 or 101 may be securable to the inside walls of the furnace instead of to the hood.

It will further be seen that the discharge stack 35 of the hood is of substantial length, approximately equal to the radius of the vessel 25 so that the gases from the annular passage flow upwardly therethrough for an appreciable length of time before mixing with the air moving upwardly through the passage 51.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An apparatus for producing carbon black including: a furnace; a discharge duct at the upper end portion of said furnace; a burner in said furnace; means for introducing gases including oxygen into the furnace; said burner including a vessel having a domed top portion provided with outlet passageways; a hood disposed about said portion and providing with said vessel an annular upwardly and inwardly arcuate passage, said annular passage opening downwardly into the furnace above said means for introducing gases into the furnace, said hood having an upwardly extending stack disposed above said vessel and in communication with the upper end of said annular passage; means for introducing gas having hydrocarbons into the lower portion of said vessel, said hood being spaced from said furnace to provide an annular passageway therebetween; and means adjacent the lower end of said hood for varying the orifice of said passageway.

2. An apparatus for producing carbon black including: a furnace; a discharge duct at the upper end portion of said furnace; a burner in said furnace; means for introducing gases including oxygen into the furnace; said burner including a vessel having a domed top portion provided with outlet passageways; a hood disposed about said portion and providing with said vessel an annular upwardly and inwardly arcuate passage, said annular passage opening downwardly into the furnace above said means for introducing gases into the furnace, said hood having an upwardly extending stack disposed above said vessel and in communication with the upper end of said annular passage; means for introducing gas having hydrocarbons into the lower portion of said vessel, said hood being spaced from said furnace to provide an annular passageway therebetween; and valve means secured to said hood adjacent its lower end and movable relative to said hood for varying the effective orifice of said passageway to vary the ratio between the rates of flow of the gases including oxygen through said annular passage and said passageway.

3. An apparatus for producing carbon black including: a furnace; a discharge duct at the upper end portion of said furnace; a burner in said furnace; means for introducing gases including oxygen into the furnace; said burner including a vessel having a domed top portion provided with outlet passageways; a hood disposed about said portion and providing with said vessel an annular upwardly and inwardly arcuate passage, said annular passage opening downwardly into the furnace above said means for introducing gases into the furnace, said hood having an upwardly extending stack disposed above said vessel and in communication with the upper end of said annular passage; means for introducing gas having hydrocarbons into the lower portion of said vessel, said hood being spaced from said furnace to provide an annular passageway therebetween; valve means secured to said hood adjacent its lower end and movable relative to said hood for varying the effective orifice of said passageway to vary the ratio between the rates of flow of the gases including oxygen through said annular passage, said passageway and said valve means including a plurality of segments secured to said hood and movable outwardly to restrict said passage between said hood and said furnace; and means operable from exterior of said furnace and operatively associated with said valve means for adjusting the positions of said segments.

4. An apparatus for producing carbon black including: a furnace; a discharge duct at the upper end portion of said furnace; means for introducing gases including oxygen into the furnace at its lower portion; a burner inside the furnace, said burner including a substantially spherical vessel having a top portion provided with outlet passageways; a substantially semi-spherical hood disposed about said top portion and providing with said vessel an annular passage extending arcuately upwardly and inwardly toward the top of said vessel, said hood having an upwardly opening discharge stack disposed above said vessel in communication with the upper end of said annular passage; means for introducing a gas having hydrocarbons into a lower portion of said vessel, said annular passage opening downwardly into the furnace above said means for introducing gases including oxygen into the furnace; and means adjacent the lower end of said hood for varying the effective orifice of said annular passage.

5. The apparatus of claim 4, wherein said hood is spaced from said furnace to provide an annular passageway therebetween, and means for varying the effective orifice of said passageway.

6. A burner including: substantially spherical vessel; means for introducing gas into said vessel; a substantially semi-spherical hood disposed about said vessel and in spaced relation to a top portion of said vessel to provide an annular passage therebetween, said vessel having a plurality of nozzles extending outwardly of said top portion and having passages communicating with said annular passage and the interior of said vessel, said hood having a discharge stack communicating with the upper end of said annular passage and opening upwardly at a point spaced above said hood adjacent substantially equal to the radius of said vessel; and valve means adjacent the lower end of said hood secured to said hood and extendable outwardly therefrom for varying an annular passageway between the hood and internal surfaces of a furnace in which said burner is positioned.

7. The burner of claim 6, wherein said valve means comprises a plurality of arcuate overlapping segments extending about said hood.

8. The burner of claim 7 wherein said segments are pivotally secured to said hood.

9. An apparatus for producing carbon black including: a furnace; a discharge duct at the upper end portion of said furnace; a burner in said furnace, means for introducing gases including oxygen into the furnace, said burner including a vessel having a domed top portion provided with outlet passageways; a hood disposed about said portion and providing with said vessel an annular upwardly and inwardly arcuate passage, said annular passage opening downwardly into the furnace above said means for introducing gases into the furnace, said hood having an upwardly extending stack disposed above said vessel and in communication with the upper end of said annular passage, said stack opening to said furnace below said discharge duct of said furnace; means for introducing gas having hydrocarbons to the lower portion of said vessel, said hood being spaced from said furnace to provide an annular passageway therebetween; and means adjacent the lower end of said hood for varying the orifice of one of said passage and said passageway.

10. An apparatus for producing carbon black including: a furnace; a discharge duct at the upper end portion of said furnace; a burner in said furnace; means for introducing gases including oxygen into the furnace, said burner including a vessel having a domed top portion provided with outlet passageways; a hood disposed about said portion and providing with said vessel an annular upwardly and inwardly arcuate passage, said annular passage opening downwardly into the furnace, said hood having an upwardly extending stack disposed above said vessel and in communication with the upper end of said annular passage, said stack opening to said furnace below said discharge duct of said furnace; means for introducing gas having hydrocarbons to the lower portion of said vessel, said hood being spaced from said furnace to provide an annular passageway therebetween; and means adjacent the lower end of said hood for varying the orifices of said passage and said passageway.

References Cited by the Examiner

UNITED STATES PATENTS

| 2,547,276 | 4/1951 | Marsh et al. | 158—104 |
| 2,992,074 | 7/1961 | Balka et al. | 23—209.6 |

FOREIGN PATENTS

| 537,902 | 3/1957 | Canada. |

MORRIS O. WOLK, *Primary Examiner.*

DELBERT E. GANTZ, H. A. BIRENBAUM, *Examiners.*